Patented Sept. 17, 1946

2,407,920

UNITED STATES PATENT OFFICE 2,407,920

PROCESS OF PRODUCING PENTAERYTHRITOL

Richard F. B. Cox, Wilmington, Del., assignor to Hercules Powder Company, Wilmington, Del., a corporation of Delaware No Drawing. Application September 25, 1942, Serial No. 459,707

8 Claims. (Cl. 260—635)

This invention relates to an improved process for the preparation of pentaerythritol. More particularly, it is concerned with an improved method for recovering pentaerythritol from the crude reaction mixture of acetaldehyde and formaldehyde.

Pentaerythritol has been prepared according to different procedures described in the art by the condensation of acetaldehyde with formaldehyde in the presence of an alkaline catalyst. Considerable difficulty has been experienced in obtaining maximum yields of pentaerythritol due in part to the exacting conditions under which the reaction must be conducted and in part to the formation of by-products during the recovery of the pentaerythritol from the reaction mixture. Various methods have been described for the removal of the metal ion from the catalyst which is present as a formate. For example, calcium has been precipitated as the sulfate or oxalate in such a manner that formic acid has remained in the reaction mixture. In working up the pentaerythritol-formic acid solution, it has been general to concentrate and crystallize the pentaerythritol. In carrying out this concentration, however, non-crystallizable syrups have resulted due to the formation of formic esters by reaction between the pentaerythritol and the formic acid, thus reducing the yield of crystalline pentaerythritol.

Now, in accordance with this invention, a method has been found of recovering high yields of pentaerythritol from the crude pentaerythritol reaction mixture resulting from the condensation of acetaldehyde with formaldehyde in the presence of an alkaline catalyst. The improved method involves removing the formic acid from the hot reaction mixture by converting the formic acid into a formic ester characterized by the ability to produce a ternary azeotropic composition with the alcohol used to form the ester and water, said azeotropic composition having a boiling point of not more than 99° C. In general, a vaporized monohydric alcohol is distilled into the hot reaction mixture containing pentaerythritol and formic acid and the ester distills out of the solution leaving behind a solution of pentaerythritol from which the pentaerythritol can be isolated by crystallization, evaporation, or by spray drying. Thus, in carrying out the process of producing pentaerythritol involving condensation of acetaldehyde with formaldehyde in the presence of an alkaline catalyst, acidification of the reaction mixture, and removal of the metal ion of the catalyst, the reaction mixture is treated with a monohydric alcohol which forms a formic ester characterized by the ability to produce a ternary azeotropic composition with the alcohol and water, said azeotropic composition having a boiling point of not more than 99° C., while the reaction mixture is maintained at a temperature of from about 60° C. to about 99° C. and the formic ester is removed.

Now, having indicated in a general way the nature and purpose of the invention, the following examples will illustrate the invention but are not to be construed as limiting the same. In the examples, the ingredients are in parts by weight unless otherwise indicated.

Example 1

To 90 parts of formalin (35% formaldehyde) and 200 parts of water were added simultaneously 11 parts acetaldehyde and 9.5 parts calcium hydroxide. The reaction was carried out at a temperature between 18° C. and 41° C. for a period of six hours. After the reaction was complete, the condensate was acidified with carbon dioxide and filtered to remove excess lime and insoluble material. The filtrate was then concentrated in vacuo and crystallized alternately with removal of the crystals in 5 crops. Alcohol was then added to the filtrate to precipitate the alcohol-insoluble pentaerythritol-calcium formate crystallizable material from the alcohol-soluble non-crystalline syrups. The pentaerythritol-calcium formate crystalline material amounting to 46 parts was removed by filtration and then dissolved in 100 parts of water and acidified with 25 parts of 50% sulfuric acid. The precipitated calcium sulfate was removed by filtration and was given a displacement wash with water. The solution amounting to 150 parts and containing pentaerythritol and formic acid was then heated to 95° C. while hot ethanol vapors were passed through the solution to carry off the formic acid as the volatile ethyl ester, having a boiling point of 54° C. The distillates were collected and analyzed for formic ester by saponification and calculated as formic acid. The results were as follows:

| Fraction | Weight | Weight HCOOH |
|---|---|---|
| 1 | 130 | 5.02 |
| 2 | 108 | 1.45 |
| 3 | 170 | .34 |
| 4 | 192 | .19 |
| 5 | 176 | .07 |
| 6 | 168 | .02 |
| 7 | 192 | .03 |

The aqueous solution thus freed of formic acid was concentrated in vacuo and crystallized alternately with removal of pentaerythritol, each crop of pentaerythritol being given a displacement wash with water. The last of the pentaerythritol was removed from the mother liquor by precipitation with alcohol. The total pentaerythritol amounted to 28 parts by weight, or an 80% yield based on the acetaldehyde.

*Example 2*

To 175 parts of formalin (35% formaldehyde) and 370 parts of water were added simultaneously 22 parts of acetaldehyde and 20 parts calcium hydroxide. The reaction was carried out under the same reaction conditions as in Example 1. After the reaction was complete, the solution was acidified with 47 parts of 50% sulfuric acid. Calcium sulfate was removed by filtration and given a displacement wash with hot water. The filtrate and wash water were freed of the last of the calcium by the addition of oxalic acid and filtered.

The reaction mixture containing pentaerythritol and formic acid was heated to 90° C. while hot methanol vapors were passed through the solution to carry off the formic acid as the volatile methyl formate having a boiling point of 32° C. This was continued until 100 parts methanol had been distilled through the solution. The solution of pentaerythritol freed of formic acid was then concentrated in vacuo and the pentaerythritol was crystallized. After removal of the first crop of pentaerythritol, the solution was concentrated to get further crops. The last of the pentaerythritol was obtained by adding alcohol in which the pentaerythritol was insoluble and the non-crystalline syrups were soluble. The total yield of pentaerythritol thus obtained amounted to 54 parts, or an 80% yield based on the acetaldehyde.

The normal formaldehyde-acetaldehyde ratio which may be used in carrying out the process of this invention may be from about 2.5 to 1 to about 6 to 1 and preferably from about 4 to 1 to about 5 to 1. A preferred ratio of alkaline content is from about 1.0 to about 1.2 equivalents per mol of acetaldehyde although more alkaline catalyst may be used if desired.

In carrying out the process of this invention, calcium hydroxide is preferred as the alkaline catalyst. However, other alkaline catalysts such as sodium hydroxide, potassium hydroxide, barium hydroxide, magnesium hydroxide, strontium hydroxide, and the like may be used.

In the examples, methanol and ethanol vapors were used as the monohydric alcohols. However, monohydric alcohols may be used that will convert the formic acid into a formic ester characterized by the ability to produce a ternary azeotropic composition with the alcohol and water, said azeotropic composition having a boiling point of not more than 99° C., such as n-propyl, isopropyl, n-butyl, isobutyl, tertiary butyl, n-amyl, iso-amyl and the like.

The amount of such monohydric alcohols may vary, but generally speaking an amount should be used adequate to esterify all of the formic acid present in the reaction mixture, as well as to form a ternary azeotropic composition with formic ester and water.

The temperature of the reaction mixture during the esterification and removal of the formic esters may vary from about 60° C. to about 99° C. but is preferably from about 80° C. to about 99° C.

In the examples, a method of preparing the crude pentaerythritol solution is shown. However, any other method of carrying out the condensation may be employed. It is preferred, however, to use a method which will direct the reaction to the formation of pentaerythritol and keep side reactions at an absolute minimum. The time and temperature of the reaction may vary according to known ranges. The condensate may be acidified with any mineral acid as a sulfuric or hydrochloric acid by any of the means known to the art. Generally, the metal ion of the catalyst may be removed before removal of the formic esters, but, if desired, the formic esters may be first removed from the condensate. The metal ion of the catalyst may be removed in various ways. For example, if calcium hydroxide is used as the catalyst, the calcium may be precipitated from the reaction mixture as calcium sulfate. The formic acid is removed from the reaction mixture as the formic ester characterized by the ability to produce a ternary azeotropic composition having a boiling point of not more than 99° C. with the alcohol used to form the ester and water, for example, by distilling vapors of a monohydric alcohol into the reaction mixture while the reaction mixture is maintained at a temperature of from about 60° C. to about 99° C. If desired, however, the monohydric alcohol may be added as a liquid. The process is usually continued until 90–100% of the formic acid is removed from the reaction mixture. If desired, however, it may be discontinued before this amount of formic acid has been removed. The reaction mixture thus freed from formic acid may be concentrated according to the method shown in Example 1 or other known methods and the crystalline pentaerythritol recovered.

When pentaerythritol is isolated by concentration of the acidified condensate of acetaldehyde and formaldehyde, the large amounts of formic acid set free react during the concentration to esterify the pentaerythritol and to catalyze reaction between aldehydes and pentaerythritol. By the process of removing the formic acid from the reaction mixture in the form of its ester by treating the reaction mixture with a monohydric alcohol, while the reaction mixture is maintained at a temperature of from about 60° C. to about 99° C., a convenient and efficient method is provided of preventing side reactions with pentaerythritol and a materially increased yield of pentaerythritol is thus obtained.

What I claim and desire to protect by Letters Patent is:

1. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with methanol to convert the formic acid present into methyl formate, distilling off said methyl formate while maintaining the temperature of the mixture at from about 60° C. to about 99°C., and recovering pentaerythritol from the residue.

2. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with ethanol to convert the formic acid present into ethyl formate, distilling off said ethyl formate while maintaining the temperature of the mixture at from about 60° C. to about 99° C., and recovering pentaerythritol from the residue.

3. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with isopropanol to convert the formic acid present into isopropyl formate, distilling off said isopropyl formate while maintaining the temperature of the mixture at from about 60° C. to about 99° C., and recovering pentaerythritol from the residue.

4. A process for making pentaerythritol comprising the condensation of acetaldehyde and formaldehyde in the presence of an alkaline material, adding an acidic precipitant for the metal ion of the alkaline material thereby freeing formic acid, removing the metal ion of the alkaline material, heating the remaining mixture comprising pentaerythritol and formic acid to a temperature of from about 60° C. to about 99° C., passing vapors of a monohydric alcohol, which will form a ternary azeotropic composition having a boiling point of not more than 99° C. of such monohydric alcohol, the formic ester thereof and water, through the mixture to convert the formic acid into the ester, distilling off said formic ester while maintaining the temperature of the mixture at from about 60° C. to about 99° C., and recovering pentaerythritol from the residue.

5. A process for making pentaerythritol comprising condensing acetaldehyde and formaldehyde in the presence of an alkaline material, adding an acidic precipitant for the metal ion of the alkaline material thereby freeing formic acid, treating the resulting mixture with a monohydric alcohol, which will form a ternary azeotropic composition having a boiling point of not more than 99° C. of such monohydric alcohol, the formic ester thereof and water, to convert the formic acid into the ester, distilling off said formic ester while maintaining the temperature of the mixture at from about 60° C. to about 99° C., and recovering pentaerythritol from the residue.

6. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with a monohydric alcohol, which will form a ternary azeotropic composition having a boiling point of not more than 99° C. of such monohydric alcohol, the formic ester thereof and water, to convert the formic acid into the ester, distilling off said formic ester while maintaining the temperature of the mixture at from about 60° C. to about 99° C., and recovering pentaerythritol from the residue.

7. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with a monohydric alcohol, which will form a ternary azeotropic composition having a boiling point of not more than 99° C. of such monohydric alcohol, the formic ester thereof and water, to convert the formic acid into the ester, distilling off said formic ester while maintaining the temperature of the mixture at from about 80° C. to about 99° C. and recovering pentaerythritol from the residue.

8. A process for making pentaerythritol comprising condensing acetaldehyde and formaldehyde in the presence of an alkaline material, adding an acidic precipitant for the metal ion of the alkaline material thereby freeing formic acid, removing the metal ion of the alkaline material, treating the remaining mixture comprising pentaerythritol and formic acid with vapors of a monohydric alcohol, which will form a ternary azeotropic composition having a boiling point of not more than 99° C. of such monohydric alcohol, the formic ester thereof and water, to convert the formic acid into the ester, distilling off said formic ester while maintaining the temperature of the mixture at from about 60° C. to about 99° C., and recovering pentaerythritol from the residue.

RICHARD F. B. COX.